Patented Jan. 11, 1938

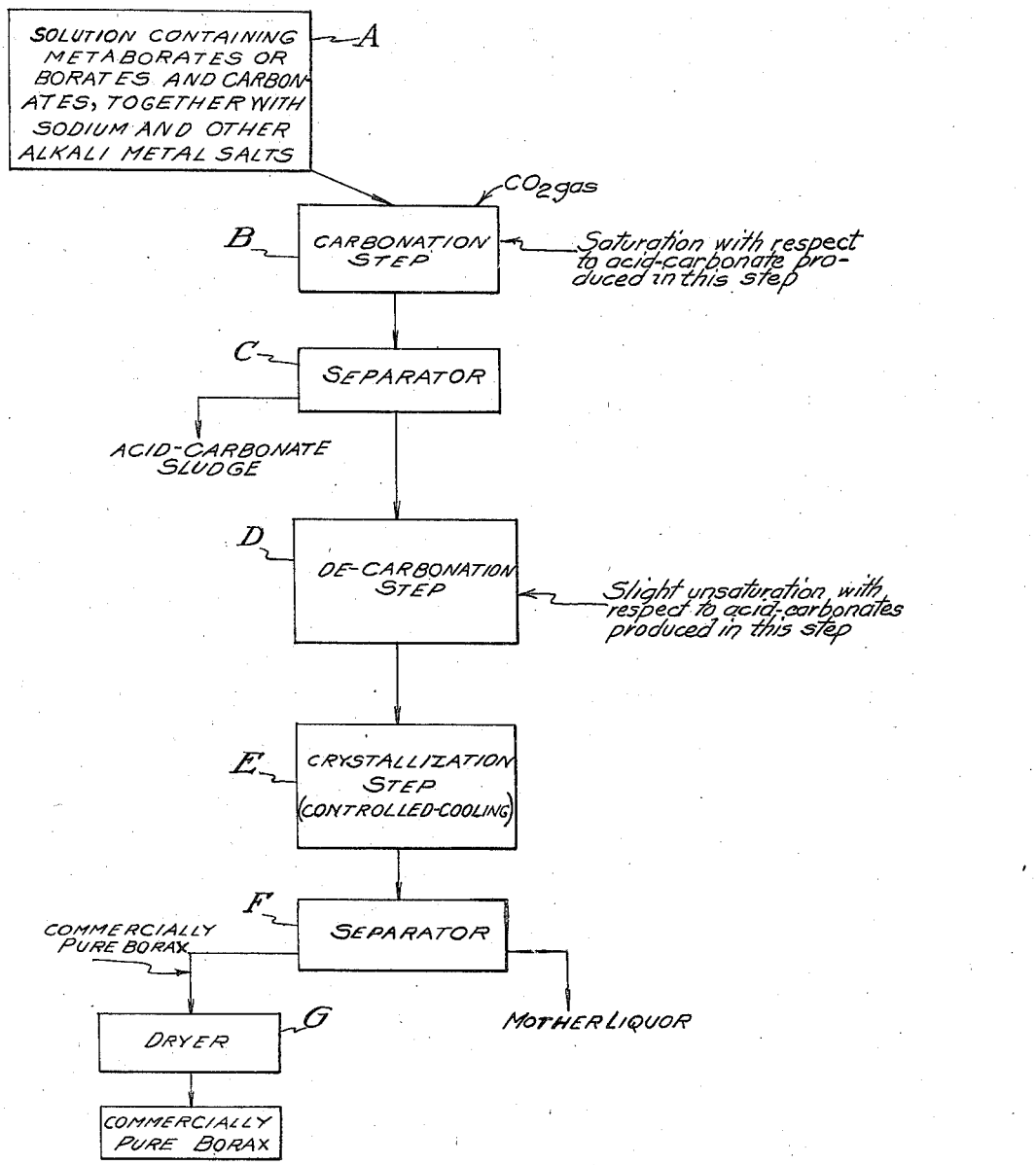

2,105,109

UNITED STATES PATENT OFFICE 2,105,109

PROCESS FOR PRODUCTION OF BORAX

Paul T. Dolley, Bartlett, Calif., assignor to Pacific Alkali Company, Los Angeles, Calif., a corporation of Delaware Application November 19, 1934, Serial No. 753,701

6 Claims. (Cl. 23—59)

This invention relates to recovery of borax from alkali metal salt solutions containing borates, and the main object of the invention is to provide for recovery of pure borax from such solutions by a single stage crystallization so as to dispense with the necessity for a plurality of stages of crystallization in order to produce borax sufficiently pure for commercial purposes and to thereby effect a marked economy in the production of pure borax. It will be understood that the term "pure borax" here refers to borax which is sufficiently pure or free from other ingedients to be saleable as commercially pure borax.

Alkali metal salts of boric acid very frequently occur naturally in solid deposits or waters in conjunction with alkali metal carbonates. Also, in connection with the manufacture of alkali metal salts, solutions containing borates generally also contain carbonates and are frequently saturated with sodium carbonates. The production of borax from the above-mentioned sources involves the separation of the borax from the carbonates, a separation heretofore usually accomplished by means of one or more crystallizations of the borax recovered from such sources. The object of this invention is the recovery of substantially pure borax direct from alkali metal salt solutions containing sodium and borates, and which also contain metaborates or carbonates or both metaborates and carbonates, even though such solutions are saturated with carbonates.

Several methods have been devised and used for the recovery of borax from such solutions. The solution may be treated with a reagent, such as an alkaline earth borate, in such quantity as to practically completely precipitate the carbonate content of the solution, leaving substantially only borax in solution, which borax can then be recovered by cooling or evaporation or both. Such a process requires, in addition to a crystallization, a prolonged difficulty carried out digestion and the filtering from the solution of a voluminous precipitate.

Another method is to remove part of the carbonate content of the solution by the absorption of $CO_2$ or application of bicarbonate, generally at an elevated temperature, and, subsequent to the separation of the borax solution from the precipitated carbonate, to cool the solution and cause crystallization of borax. By the use of this method the borax first recovered is mixed with 5 to 25% of sesqui or bicarbonate, and must be either extensively washed, entailing considerable loss of borax, or redissolved and recrystallized, also entailing considerable loss of borax together with the expense of the extra processing. No especial method of cooling or treating the solution, to prevent the precipitation of carbonates, has been specified or used in this process.

Another method, applicable to solutions of which the carbonate content is relatively low, or has been reduced to this condition and in which boric acid is presumably present, due to the presence of excess acid, such as $CO_2$, is to apply sodium carbonate to the solution to cause the reaction:

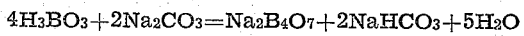
$$4H_3BO_3+2Na_2CO_3=Na_2B_4O_7+2NaHCO_3+5H_2O$$

to take place, thus reducing the solubility of the borates in solution and causing their precipitation as borax. Cooling is also used to increase the precipitation of borax. By this method more acid carbonate is generally generated than will remain in solution and some of it precipitates out of solution along with the borax. In fact, the purpose of the method is to obtain a high yield of borax from this particular type of solution and no means is used to control the concentration of boric acid in the original solution and the consequent concentration of acid carbonate in the final solution to prevent crystallization of carbonate along with the borax.

Another method, applicable to solutions containing carbonates and borates substantially in the form of metaborates is to add an acid substance, such as sulfur dioxide, to the solution which will generate in, or furnish to the solution bicarbonate to react with the metaborate to form borax, which will precipitate out of solution to some extent due to its lower solubility. The originators of this method offer no means for preventing the precipitation of carbonate along with the borax nor do they claim that the borax so produced is of commercial quality without further purification. In fact, I have found that the rate of application of acid substance would have to be quite slow in many cases to prevent the precipitation of carbonates before even the borax began to precipitate due to the difference in rates of crystallization. There is no practical means of knowing how to control the application of acid substance so as to get the maximum yield of borax without precipitation of carbonates. Also, such acid substances are relatively expensive and not always available and must be used in considerable quantity.

It is well known to those skilled in the art, that, if carbon dioxide or carbonic acid is passed into an alkali metal salt solution containing carbonates and a considerable proportion of sodium salts, the carbon dioxide or carbonic acid will be absorbed and the solution may be caused by those skilled in the art to reach a condition of saturation with respect to sodium sesquicarbonate ($Na_2CO_3 \cdot NaHCO_3 \cdot 2H_2O$). After this condition is reached the absorption of more carbon dioxide or carbonic acid is followed by the crystallization of sodium sesquicarbonate from the solution. The same result may be obtained by passing carbon dioxide or carbonic acid into a solution containing a substantial amount of sodium metaborate ($Na_2B_2O_4$) in order to convert the sodium metaborate into sodium biborate which can be crystallized as borax ($Na_2B_4O_7 \cdot 10H_2O$). Thus, by methods well known to those skilled in the art, any alkali metal salt solution containing borates and carbonates, or metaborates alone, together with a substantial amount of sodium may readily be made into a solution containing borax and carbonate and bicarbonate in such a proportion that it is saturated with respect to sodium sesquicarbonate but not with borax or any other salt. In case the amount of carbonate or metaborate originally present is small it may be preferable, though not necessary, to cause the solution to be saturated with respect to sodium bicarbonate.

From the above described solutions not only borax will crystallize upon cooling but also sodium sesquicarbonate, or bicarbonate, as the case may be. This invention consists in the production, if necessary, of such borax solutions and in such a treatment of such solutions saturated with respect to sodium sesquicarbonate or sodium bicarbonate, followed by cooling, that substantially pure borax, substantially free of carbonates, may be crystallized directly from them and separated from said solutions by filtering and washing or other means to produce the usual borax of commerce. I have discovered that if a borax solution saturated with respect to sodium sesquicarbonate, substantially containing only alkali metal salts, be treated so as to sufficiently reduce the concentration of bicarbonate radical to make said solution unsaturated with respect to sodium sesquicarbonate at a temperature at, or a little (say 1–2° C.) above, the starting temperature of borax crystallization; and if the solution then be cooled at a fairly slow rate (say from 40° C. to 20° C. in one to four hours) with some agitation, the borax substantially alone will crystallize from the solution, until a temperature (say 15° C. to 20° C.), as low as is usually economical to reach, is attained; and may be recovered as commercially pure borax from the solution by filtering and washing or other effective means. I have further discovered that the above stated procedure is effective in producing commercially pure borax from solutions in equilibrium with solid $NaHCO_3$, hereinafter referred to as bicarbonate saturated solutions. However, in the case of bicarbonate saturated solutions a considerably greater degree of unsaturation with respect to sodium bicarbonate is required to be effected than is necessary in the case of sodium sesquicarbonate saturated solutions. I have discovered that the reduction of bicarbonate radical concentration to produce the required unsaturation of an alkali metal salt solution with respect to sodium sesquicarbonate may be effected by separating from the solution a small amount of carbon dioxide, by heating, aeration, or other means; by precipitation of some of the carbonate radical with a chemical reagent such as a sufficiently soluble compound of calcium or barium; or by the addition of a solution containing a reagent, such as sodium metaborate, which will convert sodium bicarbonate to sodium carbonate; or by quick cooling with very little agitation to a temperature a little under the start of crystallization temperature of the borax followed by quick separation of the solution from the precipitated sodium sesquicarbonate, although this latter method is usually undesirable because it generally entails the loss of some borax in the discarded sodium sesquicarbonate sludge. I have also discovered that an alkali metal salt solution containing borax and saturated with respect to sodium bicarbonate may be treated to reduce the bicarbonate radical concentration, and make such solution sufficiently unsaturated with respect to sodium bicarbonate, by separation from it of carbon dioxide by heating or aeration, or by precipitation of the carbonate radical with a chemical reagent, or by the addition of a solution containing a reagent, such as sodium metaborate, which will convert sodium bicarbonate to sodium carbonate, thus making possible the production of substantially carbonate-free borax directly from such solution. In general, a very small amount of carbon dioxide is required to be removed from an alkali metal salt solution containing borax and saturated with respect to sodium sesquicarbonate in order to make possible the production of commercially pure borax directly from said solution.

The expressions "acid carbonate saturated" or "saturated with respect to an acid carbonate" as used herein and in the appended claims, will be understood to designate saturation with respect to acid sodium carbonate salts, and more specifically, with respect to sodium sesquicarbonate or sodium bicarbonate.

Essentially this invention, in its entirety, consists of a means of recovering commercially pure borax directly from an alkali metal salt solution, containing sodium and borates and which may contain carbonates, by first causing the solution to be saturated with respect to sodium sesquicarbonate, or sodium bicarbonate, as the case may be, if it is not already in this condition; then next causing the solution to be a little unsaturated with respect to sodium sesquicarbonate, or considerably unsaturated with respect to sodium bicarbonate, as the case may be, at a temperature, at, or a little above, the starting temperature of crystallization of the borax in the solution; and finally by cooling the solution, at not too rapid a rate, to cause the crystallization of the borax, which may be separated from the solution by any well known means.

In any one of the above described embodiments of my invention there is produced an alkali metal salt solution containing sodium tetraborate and saturated with an acid carbonate (either sesquicarbonate or bicarbonate as the case may be), the solution being then treated so as to render it sufficiently unsaturated with respect to such acid carbonate at a temperature, at, or a little above, the starting temperature of crystallization of borax from the solution, that, according to the requirements of the particular acid carbonate involved, the desired preferential precipitation of borax may be effected, and the solution being then cooled at a sufficiently slow rate to effect precipitation of borax therefrom without substantial precipitation of acid carbonate, the borax so precipitated being then separated from the solution in any suitable manner.

The fundamental steps in the process are shown in the accompanying flow sheet, and referring thereto: A source of brine is shown at A, containing borate compounds and sodium and/or other alkali metal salts including sodium carbonate. The brine from A is supplied to a carbonation step B, in which the solution is caused to be saturated with respect to an acid carbonate of sodium. During this carbonation step some precipitation of acid carbonate will usually result, which may be separated from the brine in a separation step C. The brine is then passed to a decarbonation step D where the solution is caused to be somewhat unsaturated with respect to the particular acid carbonate involved (slightly unsaturated with respect to sodium sesquicarbonate, or considerably unsaturated with respect to sodium bicarbonate, for example). The decarbonated brine is then subjected to a controlled cooling step E, producing a crystallization and precipitation of the borax, which may be separated from the mother liquor at F and passed through a dryer G and recovered as commercially pure borax.

An example of the application of this invention is as follows: A quantity of alkali metal salt solution of the composition given in the table below was treated with lime kiln gas, containing about 30% carbon dioxide by volume, to cause conversion of a portion of the sodium carbonate to bicarbonate and to convert the metaborate to tetraborate, and such treatment was continued until the solution became saturated with respect to sodium sesquicarbonate and a considerable amount of sodium sesquicarbonate had crystallized from it. After separation of the solution from the solid sodium sesquicarbonate, the solution had the composition given in the table below. The solution was then heated to 80° C. and held at this temperature for 24 hours. (Ordinarily aeration is preferred to heating in order to remove carbon dioxide, but in this case heating was more convenient.) After heating, the solution was allowed to cool to 40° C., about 4° C. above the starting temperature of crystallization of the borax. The solution then had the composition given in the table below.

*Composition of the solution*

| Percent | Before carbonation | After carbonation | After heating | After borax crystallization |
|---|---|---|---|---|
| $Na_2CO_3$ | 15.6 | 6.6 | 6.8 | 7.1 |
| $NaHCO_3$ | | 2.0 | 1.7 | 1.8 |
| $Na_2B_4O_7$ | .2 | 3.4 | 3.4 | 1.6 |
| $Na_2B_2O_4$ | 3.5 | | | |
| $Na_2SO_4$ | 2.9 | 3.4 | 3.4 | 3.5 |
| NaCl | 9.0 | 10.4 | 10.4 | 10.8 |
| KCl | 5.0 | 5.8 | 5.8 | 6.0 |
| $Na_2SiO_3$ | .05 | .06 | .06 | .06 |
| Other material | .4 | .5 | .5 | .5 |
| $H_2O$ | 63.3 | 67.8 | 67.9 | 68.6 |

One thousand pounds of this heat-treated solution was then cooled from 40° C. to 19° C., at a regular rate, by atmospheric evaporation, during 14 hours time. (The slow cooling rate, slower than necessary to prevent crystallization of carbonates, was used in order to obtain large borax crystals). The crystallized borax was then filtered off in a centrifugal machine and washed with water and dried. Thirty pounds of commercial borax were obtained. After the crystallization of the borax the solution had the composition given in the table above. The recovered borax had the following composition:

| | Per cent |
|---|---|
| $Na_2B_4O_7.10H_2O$ | 99.82 |
| $Na_2SO_4$ | .013 |
| NaCl | .05 |
| $Na_2CO_3.NaHCO_3.2H_2O$ | .10 |
| $SiO_2$ | .01 |
| $Na_3PO_4$ | .00 |
| Other material and water | .007 |

While the above example well illustrates a particular method of carrying out this invention, it is to be understood that various modifications and changes in the procedure may be made without departing from the principles of the invention and the invention includes all such modifications which come within the scope of the following claims.

I claim:

1. The method of obtaining commercially pure borax from an aqueous solution saturated with respect to an acid carbonate of sodium and containing substantial amounts of borax which comprises removing carbon dioxide of the acid carbonate to the extent that the solution becomes unsaturated with respect to acid carbonate at the temperature at which borax commences to crystallize from the solution, slowly cooling the solution to crystallize borax therefrom, and separating the commercially pure borax from the solution.

2. The method of obtaining commercially pure borax from an aqueous solution saturated with respect to an acid carbonate of sodium and containing substantial amounts of borax which comprises heating said solution to drive carbon dioxide therefrom to the extent that the solution becomes unsaturated with respect to acid carbonate at the temperature at which borax commences to crystallize from the solution, slowly cooling the solution to crystallize borax therefrom, and separating the commercially pure borax from the solution.

3. The method of obtaining commercially pure borax from an aqueous solution saturated with respect to an acid carbonate of sodium and containing substantial amounts of borax which comprises aerating said solution to drive carbon dioxide therefrom to the extent that the solution becomes unsaturated with respect to acid carbonate at the temperature at which borax commences to crystallize from the solution, slowly cooling the solution to crystallize borax therefrom, and separating the commercially pure borax from the solution.

4. The process as in claim 1 wherein the acid carbonate is sodium sesquicarbonate.

5. The process as in claim 2 wherein the acid carbonate is sodium sesquicarbonate.

6. The process as in claim 3 wherein the acid carbonate is sodium sesquicarbonate.

PAUL T. DOLLEY.